Nov. 15, 1966  R. E. HARTSOUGH  3,285,153

BUILDING VENTILATING SYSTEM

Filed Sept. 8, 1964  4 Sheets-Sheet 1

INVENTOR.
RUSSELL E. HARTSOUGH
BY
m.a. Hobbs
ATTORNEY

INVENTOR.
RUSSELL E. HARTSOUGH
BY M. A. Hobby
ATTORNEY

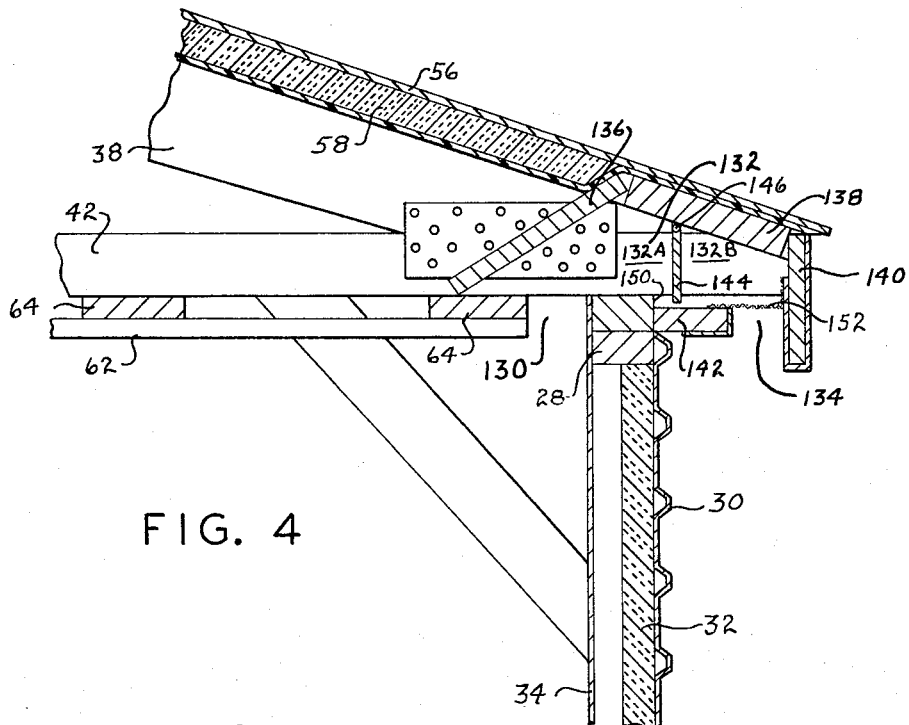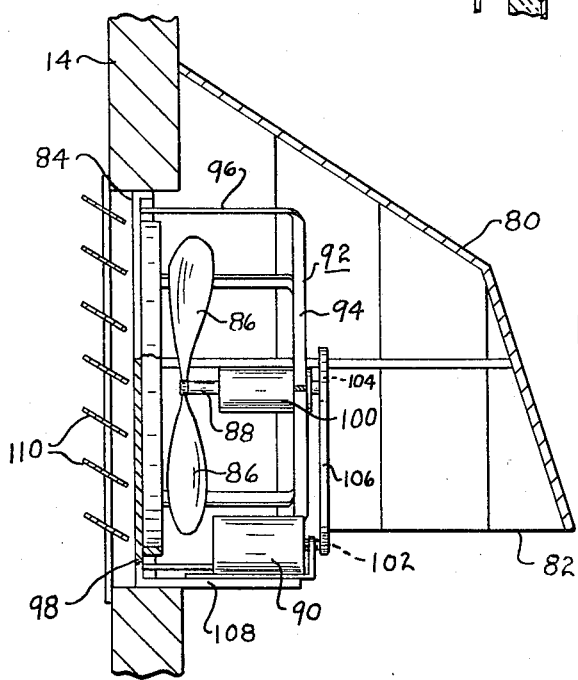

United States Patent Office 3,285,153
Patented Nov. 15, 1966

3,285,153
BUILDING VENTILATING SYSTEM
Russell E. Hartsough, % Hartsough Mfg. Co.,
Walkerton, Ind.
Filed Sept. 8, 1964, Ser. No. 394,981
7 Claims. (Cl. 98—33)

The present invention relates to a ventilating system, and more particularly to a ventilating system for poultry houses and the like. In the poultry industry the chickens are often raised in limited and confined areas and the laying hens are provided with confined or enclosed nests and are restricted to a rather small area in the building. Further, the chickens are often maintained in a relatively crowded condition on false or slat floors and are not permitted on the main floor or on the ground. Since the chickens are retained in these confined areas for long periods of time, possibly their entire lives, ventilation of the buildings in which they are housed becomes highly important for the health of the chickens as well as their growth and egg productivity. In the crowded conditions often maintained in poultry houses it is usually necessary to have uniform and even air flow throughout the building without creating an undue draft near the air inlets or outlets. Further, since most of the poultry houses are one story structures, the temperature of the air beneath the roof often becomes so high as a result of the sun on the roof, that the temperature in the poultry house tends to fluctuate over a wide range during the day and night. It is therefore one of the principal objects of the present invention to provide a poultry house having an attic and a ventilating system which handles a relatively large volume of air without creating drafts and which provides a uniform distribution of fresh air throughout the space occupied by the poultry.

Another object of the present invention is to provide a combination poultry house and ventilating system which is adapted to maintain a relatively constant temperature throughout the day, and which utilizes the loft as a conduit of air transmission passage for maintaining a relatively moderate temperature in the loft, and which utilizes the eaves as the air outlet which assists in giving an effective distribution of fresh air throughout the poultry house.

Still another object of the invention is to provide a poultry house having an attic which forms an inlet conduit or space for fresh air, and which distributes the air through a plurality of ports in the ceiling of the poultry house to give effective distribution to all areas of the space occupied by the poultry.

A further object of the present inzention is to provide a poultry house with a ventilating system which utilizes the eaves of the building structure in such a manner that the air can flow from the space occupied by the poultry along the entire outside edge of the ceiling and upper edge of the outside walls, and which is so constructed and arranged that the inflow of air from wind or other outside pressure is prevented when the ventilating system is not in operation.

A further object of the invention is to provide a ventilating system for a poultry house and the like which is so constructed and arranged that it is incorporated in a conventional building structure without changing or altering the structure in any substantial way, and the inlets and outlets of which are effectively protected from rain, snow and wind.

The foregoing objects are accomplished by installing in a building having a roof, walls and living space, an air outlet structure along the upper edge of the walls and extending over the upper edge thereof and discharging along the eaves of the building, and an inlet structure having a blower or fan for forcing air downwardly into the living space and therefrom through the outlet structure. This system removes the warm air near the room, forcing it downwardly through the living space and causing the used or foul air in the space to flow outwardly through the outlet structure. The system creates a constant flow of fresh air at a moderate temperature in the living space, and preferably includes a valve means in the outlet structure which prevents back flow into the system on a windy day.

Additional objects and advantages of the present invention will become apparent from the following description and accompanying drawings, wherein:

FIGURE 3 is an enlarged fragmentary cross sectional view of the building showing the air inlet structure for the ventilating system;

FIGURE 4 is an enlarged fragmentary cross sectional view of the building structure showing the construction of the outlet of the ventilating system.

Figure 1:
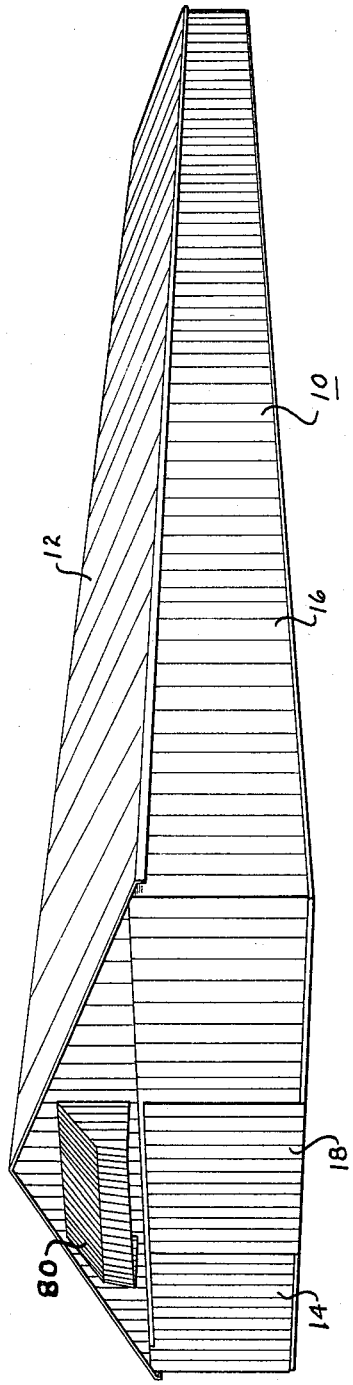
FIGURE 1 is a perspective view of a poultry house in which the present ventilating system has been incorporated, showing the inlets and outlets of the ventilating system.

Referring more specifically to the drawings, numeral 10 designates a building structure, such as a poultry house, having incorporated therein the present ventilating system, the building consisting of a gable room 12, end wall 14, and side wall 16, and corresponding end and side walls on the opposite side of the building (not shown). A sliding door 18 is provided in end wall 14 which extends upwardly above the door along the gable portion of the roof. The building thus far described is considered conventional and is covered by any suitable siding and roofing material, such as sheet metal.

Figure 2:
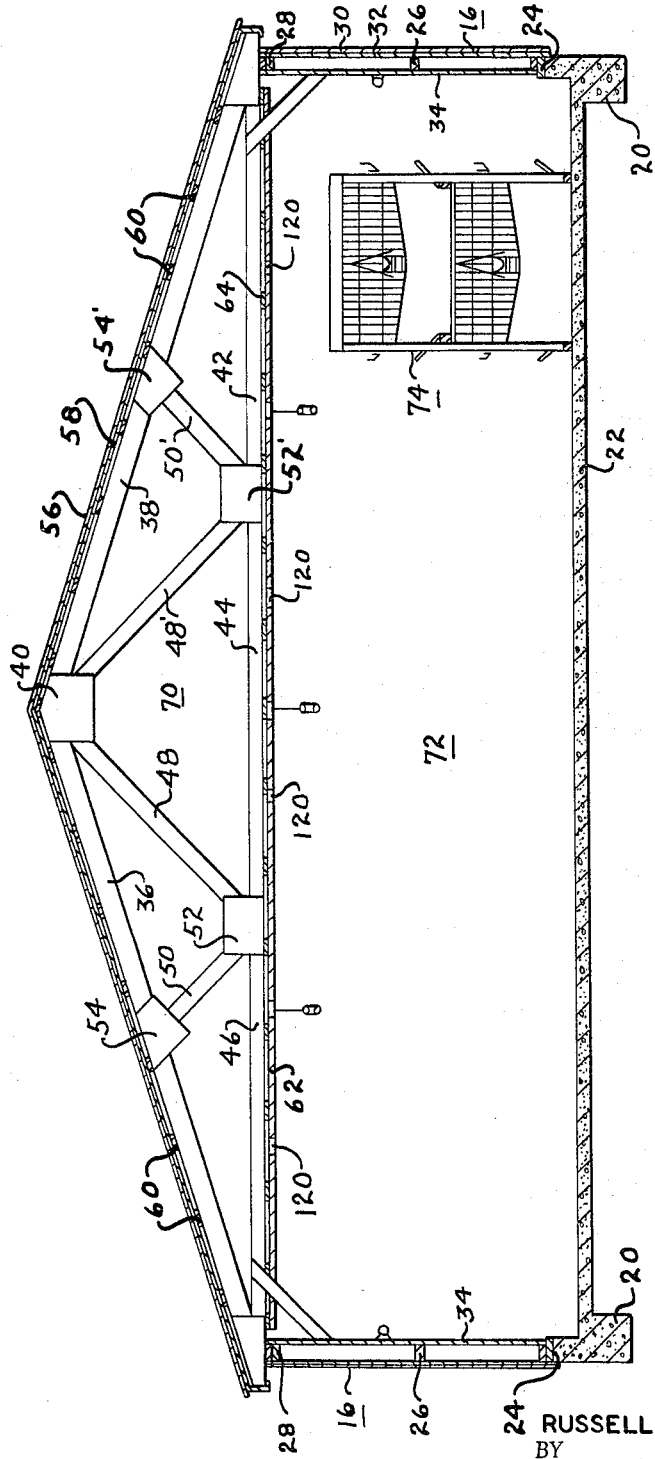
FIGURE 2 is a vertical cross sectional view through the building structure shown in FIGURE 1.

FIGURE 2 illustrates in greater detail the building construction which consists of a foundation 20 of concrete or other suitable material, concrete floor 22, sills 24, and horizontal intermediate and upper plates 26 and 28 respectively. The siding and insulation board 30 and 32, respectively, are nailed or otherwise secured to the sills and plates on the external surface thereof, and wall panel 34 is secured by nails or other suitable securing means to the internal side of the three plates. Rafters 36 and 38 rest at their lower ends on the upper edges of walls 16 and are connected to one another at their upper ends by plates 40 on opposite sides of each rafter. Joists 42, 44 and 46 extend the full width of the building between the two walls 16 and are connected to the rafters by diagonal braces 48 and 48' and 50 and 50', the lower ends of braces 48 and 50 being secured to the joists by panels 52 and to the rafters by panels 40 and 54, respectively. The sheet metal roof 56 and insulating sheathing 58 are supported on the rafters by a plurality of slats 60 spaced from one another vertically on the rafters, and ceiling panels 62 are supported on joists 42, 44 and 46 by a plurality of strips 64, and extend substantially the full width between the two walls 16, thus enclosing space 70 to form an attic or air space, as will be more fully described hereinafter. The space 72 contains the compartments for the poultry and is a relatively open space containing nests and feeding trough unit 74, only one of said units being illustrated in the drawings.

The air inlet for the present poultry house system consists of the relatively large hood 80 mounted on end wall 14 of the building and having an open bottom 82 for receiving the incoming air, the hood being connected to the loft space 70 by a relatively large opening 84 in the end wall. The air is blown into space 70 by a fan or blower consisting of propeller blades 86 mounted on shaft 88 and driven by an electric motor 90, the motor and fan being rigidly supported in front of opening 84 by a frame 92 consisting of a plurality of cross members 94 and arms 96 connecting cross members 94 to an annular support member 98 rigidly secured in opening 84. Shaft 88 is journalled in bearing 100 and is driven by motor 90 through pulleys 102 and 104 and belt 106, the motor being supported by bracket 108 on annular support member 98. Louvers 110, either of the moveable or fixed type, are mounted on the inner side of opening 84 and are preferably positioned to direct the incoming air upwardly towards the roof.

The air passing through the opening 84 and between louvers 110 is distributed throughout space 70 and is discharged therefrom through a plurality of holes 120 in ceiling panel 62, connecting space 70 with space 72. Suitable diffusers may be mounted in or on the lower side of holes 120 to distribute the air more effectively in space 72. Substantially the entire space 70 forms a conduit connecting opening 84 of the inlet with discharge holes 120, and the air, while moving between the inlet and outlet openings, circulates in the space, removing the air and maintaining a moderate temperature in the space and replacing it with fresh, cool air.

Figure 5:
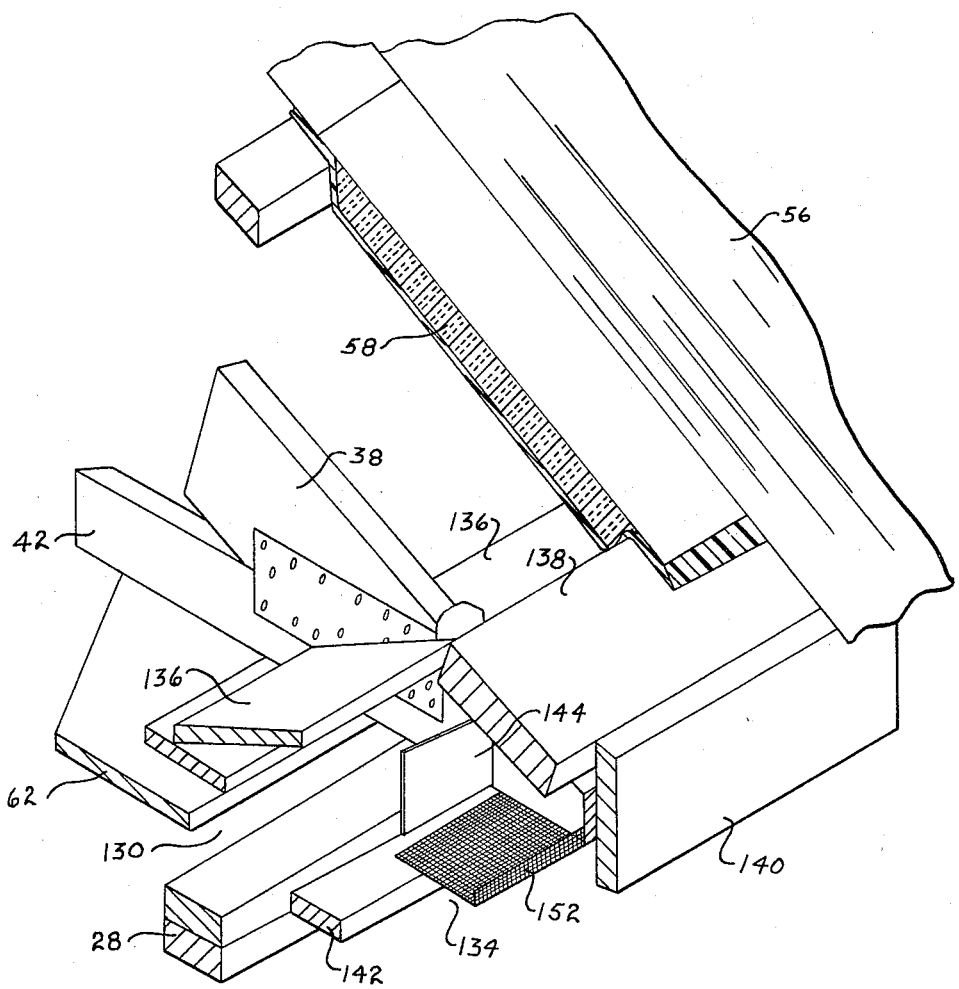
FIGURE 5 is an enlarged perspective cut-away view of the air outlet for the ventilating system illustrating the manner in which the outlet structure operates.

One of the important features of the present invention is the construction of the air outlet, this structure being shown in detail in FIGURES 4 and 5 and consisting of an opening 130 extending substantially the full length of the building on both sides. This opening is connected to a chamber 132, also extending the full length of the building, except for the intermittent joists and rafters, and an outlet opening 134 extending the full length of the eaves. Chamber 132 is defined by an inner wall 136, top 138, an outer wall 140 and a bottom 142, the bottom being spaced from outer wall 140 to provide opening 134. Wall 136 and top 138 are positioned at such an angle as to direct the air flow from opening 130 to opening 134. A valve 144 is disposed in air chamber 132 and separates the air chamber into outer and inner compartments, 132A and 132B, the valve 144 being pivoted on a hinge 146 and extending downwardly to a point adjacent the upper surface of bottom 142. The valve is adapted to swing outwardly when fan 86 is forcing air through the system, thus permitting the air to flow freely from opening 130 to opening 134. In order to prevent backflow of air through opening 134 into the building when the ventilating system is not operating, an abutment 150 is provided on the rear side of valve 144 which substantially seals off compartment 132A from compartment 132B and outlet 134. Normally, the air pressure in space 72, when the fan is in operation, is sufficient to cause the constant outward flow of air of sufficient force and volume to prevent backflow of air inwardly through outlet 134. In order to prevent birds and bugs from entering the system when it is not in operation, a screen 152 is preferably placed over the entire outlet opening 134.

In the operation of the present ventilating system, the fan is placed in operation, causing the air to flow inwardly under the hood, through opening 84, into space 70 and thence downwardly through holes 120 into space 72. The air, on leaving holes 120, is distributed or diffused throughout the entire space 72 in which the poultry is living, and thence moves upwardly along the wall to opening 130, passing outwardly through opening 130, air chamber 132, and outlet opening 134. In addition to providing adequate air for the chickens, an effective circulation without draft is provided in the entire area in which the poultry lives. When the system is not in operation, valve 144 and louvers 110, when closed, effectively close the spaces 70 and 72 from outside air, thus preventing drafts or an excessive amount of heat loss in cold weather.

While only one embodiment of the present invention has been described herein, various changes and modifications may be made to satisfy requirements.

I claim:
1. In a ventilating system for a poultry house, having a roof and side and end walls and a loft space and a living space therebeneath separated by a ceiling panel: an air intake in one of said end walls connected to said loft space, a fan in said intake, a hood with an open bottom over said intake, louvers in said intake, a plurality of holes in said panel connecting said loft space and living space, an air outlet structure disposed along the upper edge of said side walls and having an inlet opening disposed along the upper inside edge of said side walls and an outlet opening disposed along the upper outside edge of said side walls, means forming a passage connecting said openings and extending over the upper edge of the respective side walls, a valve means consisting of a panel hinged at its upper edge to swing to and fro in said passage in response to the air flow therein, an abutment in said passage for retaining said valve in closed position when the air pressure in the outlet opening is greater than the pressure in the inlet opening for preventing backflow of air through said passage, and a screen over said outlet opening.

2. In a ventilating system for a poultry house having a roof and side and end walls and a loft space and a living space therebeneath separated by a ceiling panel: an air intake in one of said end walls connected to said loft space, a fan in said intake, a hood with an open bottom over said intake, louvers in said intake, a hole in said panel connecting said loft space and living space, an air outlet structure disposed along the upper edge of said side walls and having an inlet opening disposed along the upper inside edge of said side walls and an outlet opening disposed along the upper outside edge of said side walls, means forming a passage connecting said openings and extending over the upper edge of the respective side walls, a valve means consisting of a panel hinged at its upper edge to swing to and fro in said passage in response to the air flow therein, and an abutment in said passage for retaining said valve in closed position when the air pressure in the outlet opening is greater than the pressure in the inlet opening.

3. In a ventilating system for a building having a roof and side and end walls and a loft space and a living space therebeneath separated by a ceiling panel: an air intake in one of said end walls connected to said loft space, a plurality of holes in said panel connecting said loft space and living space, an air outlet structure disposed along the upper edge of said side walls and having an inlet opening disposed along the upper inside edge of said side walls and an outlet opening disposed along the upper outside edge of said side walls, means forming a passage connecting said openings and extending over the upper edge of the respective side walls, a valve means in said passage, and a means for retaining said valve in closed position when the air pressure in the outlet opening is greater than the pressure in the inlet opening.

4. In a ventilating system for a building having a roof and side and end walls and a loft space and a living space therebeneath separated by a ceiling panel: a hole in said panel connecting said loft space and living space for passing air therethrough from the loft space to the living space, an air outlet structure disposed along the upper edge of said side walls and having an inlet opening disposed along the upper inside edge of said side walls and an outlet opening disposed along the upper outside edge of said side walls, means forming a passage connecting said openings and extending over the upper edge of the respective side walls, a valve means consisting of a panel hinged at its upper edge to swing to and fro in said passage in response to the air flow therein, and an abutment in said passage for retaining said valve in closed position when the air pressure in the outlet opening is greater than the pressure in the inlet opening.

5. In a ventilating system for a building having a roof and walls and a living space: an air outlet structure disposed along the upper edge of said walls and having an inlet opening disposed along the upper inside edge of said walls and an outlet opening disposed along the upper outside edge of said walls, means forming a passage connecting said openings and extending over the upper edge of the respective walls, a valve means for said passage movable to closed position when the air pressure in the outlet opening is greater than the pressure in the inlet opening, and an air inlet structure having a power means for forcing air downwardly into said living space and therefrom outward through said air outlet structure.

6. In a ventilating system for a building having a roof and walls and a living space: an air outlet structure disposed along the upper edge of said walls and having an inlet opening disposed along the upper inside edge of said walls and an outlet opening disposed along the upper outside edge of said walls, means forming a passage connecting said openings, a valve means in said passage for preventing backflow of air through said passage, and an air inlet structure having a power means for forcing air downwardly into said living space and therefrom outward through said air outlet structure.

7. In a ventilating system for a building having a roof and side and end walls and a loft space and a living space therebeneath separated by a ceiling panel: an air intake in one of said end walls connected to said loft space, a fan in said intake, a hood with an open bottom over said intake, louvers in said intake, a plurality of holes in said panel connecting said loft space and living space, an air outlet structure disposed along the upper edge of said side walls and having an inlet opening disposed along the upper inside edge of said side walls and an outlet opening disposed along the upper outside edge of said side walls, means forming a passage connecting said openings and extending over the upper edge of the respective side wall, and a valve means in said passage for preventing backflow of air through said passage.

References Cited by the Examiner
UNITED STATES PATENTS

| | | | |
|---|---|---|---|
| 1,613,897 | 1/1927 | Lichty | 98—37 |
| 1,766,876 | 6/1930 | Busby | 98—37 |
| 2,061,712 | 11/1936 | Martin | 98—37 |
| 2,708,868 | 5/1955 | Loomis | 98—37 |
| 2,718,187 | 9/1955 | Frisby | 98—37 |
| 3,000,290 | 9/1961 | Rodick | 98—33 |
| 3,111,078 | 11/1963 | Breckenridge | 98—1 |

MEYER PERLIN, *Primary Examiner.*

Disclaimer 3,285,153.—*Russell E. Hartsough*, Walkerton, Ind. BUILDING VENTILATING SYSTEM. Patent dated Nov. 15, 1966. Disclaimer filed Dec. 8, 1969, by the inventor.

Hereby enters this disclaimer to claims 3, 5, 6 and 7 of said patent.
[*Official Gazette March 31, 1970.*]